(12) United States Patent
Deaton

(10) Patent No.: US 6,183,029 B1
(45) Date of Patent: Feb. 6, 2001

(54) STORAGE COMPARTMENT FOR GOLF CARTS

(76) Inventor: Jeff D. Deaton, 45 CR 1040, Booneville, MS (US) 38829

( * ) Notice: Under 35 U.S.C. 154(b), the term of this patent shall be extended for 0 days.

(21) Appl. No.: 09/162,140

(22) Filed: Sep. 29, 1998

Related U.S. Application Data

(60) Provisional application No. 60/061,702, filed on Oct. 10, 1997.

(51) Int. Cl.[7] .................................. B60N 3/10; B60R 9/08
(52) U.S. Cl. .......................................... 296/37.1; 296/37.8
(58) Field of Search ................................. 296/37.1, 37.8, 296/37.16, 37; 280/DIG. 5; 224/274

(56) References Cited

U.S. PATENT DOCUMENTS

| | | |
|---|---|---|
| 2,556,101 | 6/1951 | Negin et al. . |
| 3,528,591 | 9/1970 | Herbulis . |
| 4,522,442 | 6/1985 | Takenaka . |
| 4,805,864 | 2/1989 | Votta . |
| 5,094,500 | 3/1992 | Maypole et al. . |
| 5,213,364 * | 5/1993 | Theckston ............................ 224/274 |
| 5,344,020 | 9/1994 | Ferguson . |
| 5,356,059 | 10/1994 | Yanez et al. . |
| 5,429,290 | 7/1995 | Green, Jr. . |
| 5,480,078 | 1/1996 | Verrette et al. . |
| 5,505,358 * | 4/1996 | Haase .................................. 296/37.8 |
| 5,628,543 | 5/1997 | Filipovich et al. . |
| 5,788,070 * | 8/1998 | Banker ............................. 206/315.2 |

FOREIGN PATENT DOCUMENTS

| | | |
|---|---|---|
| 261828 | 6/1962 | (AU) . |
| 679567 | 2/1962 | (CA) . |

* cited by examiner

*Primary Examiner*—D. Glenn Dayoan
*Assistant Examiner*—Greg Blankenship
(74) *Attorney, Agent, or Firm*—Richard C. Litman

(57) ABSTRACT

A specially adapted storage container for use with motorized golf carts. Commonly, there is an unused space on motorized golf carts lying horizontally between the rear of the seats and the front of the compartment where golf bags are kept, and vertically between the surface of the chassis and the bottom of a wire basket mounted behind the seats. This invention makes this unused space available for storage. It is available in either a wire-mesh or fully enclosed version, and, depending on the embodiments, may be accessed either from one of the sides, from the rear, or from the front, via the opening usually found between the seat cushion and the seat back on golf carts.

3 Claims, 4 Drawing Sheets

STORAGE COMPARTMENT FOR GOLF CARTS

CROSS-REFERENCE TO RELATED APPLICATION

This application claims the benefit of U.S. Provisional Patent Application Ser. No. 60/061,702, filed Oct. 10, 1997.

BACKGROUND OF THE INVENTION

1. Field of the Invention

The present invention relates generally to accessories for motorized golf carts and, more specifically, to storage containers for use with motorized golf carts.

2. Description of Related Art

Conventional motorized golf carts typically include an open topped wire basket mounted to the cart in a space located between the rear of the seat backs and the location at the rear of the cart intended for the storage of golfbags. This wire basket is a convenience intended to enable the storage of articles such as towels, rain gear, and the like. Due to the fact that they typically lack a cover, however, such containers are usually not secure. Moreover, the containers are often mounted a considerable distance above the surface of the golf cart chassis lying below it. As such, the typical golf cart includes a significant amount of unused space, extending vertically from the bottom of the wire basket to the surface of the chassis below, and horizontally from the seatbacks to an aperture in the rear of the cart where golfbags are stored. Typically, extra space is often required for shoes, coolers, golf balls, etc. for at least two riders.

Close examination of the relevant art reveals many types of storage containers adapted for use on specific locations in various vehicles, but no such container has been designed for use in the space behind the seatbacks and below the standard wiremesh basket found on most golf carts. U.S. Pat. No. 2,556,101, issued to Negin et al., discloses a cargo hold specially adapted for attachment to the rear body end of Jeeps. U.S. Pat. No. 3,528,591, issued to Herbulis, as well as U.S. Pat No. 5,480,078, issued to Verrette, et al., disclose receptacles adapted to attach to a manually translating golf bag cart. U.S. Pat. No. 4,522,442, issued to Takenaka, discloses a trunk storage system consisting of a removable trunk and lid for use in vehicles having a front leg shield with a cavity formed therein. U.S. Pat. No. 4,805,864, issued to Votta, discloses a beverage carrier apparatus for use in a vehicle which includes a leveling means that is laterally displaceable relative to the apparatus and the interior of the vehicle. U.S. Pat. No. 5,344,020, issued to Ferguson, discloses a storage device for attachment to the underside of the roof of a motorized golf cart. U.S. Pat. No. 5,429,290, issued to Greene, Jr., discloses a retrofittable carrier for holding passengers or cargo which is mountable to the rear end of standard utility golf carts. Finally, U.S. Pat. No. 5,628,543, issued to Filipovich et al., discloses a motor vehicle seat back having a trunk pass through and associated ski tote bag.

None of the above inventions and patents, taken either singly or in combination, is seen to describe the instant invention as claimed, since none describes a container specifically adapted to mount on the chassis surface directly behind the seats on motorized golf carts.

SUMMARY OF THE INVENTION

The present invention make use of the unused space in motorized golf carts behind seatbacks and below the bottom of the wiremesh container typically mounted to the rear of the seatbacks. The present invention provides additional storage space. The present invention is a storage unit which may either be manufactured with the cart itself or sold as an aftermarket component. Depending on the embodiment chosen, the storage space is accessible either from the front of the container unit, through the space between the seat bottom and the seat back; from the side of the container unit; or from the rear. Moreover, selected embodiments of the present invention enable the contents therein to be securely locked away and hidden from view in the container unit which is waterproof, thus providing a set of conveniences typically lacking in the standard storage devices provided with golf carts.

Accordingly, it is a principal object of the invention to make effective use of the empty space found behind the seatbacks and below the open topped wire baskets in most motorized golf carts.

It is another object of the invention to provide storage means on such golf carts which enable the contents to be hidden from view and securely locked away.

It is a further object of the invention to provide storage means on motorized golf carts which are waterproof.

Further still, it is an object of the invention to provide a storage compartment configuration which increases space utilization on motorized golf carts.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
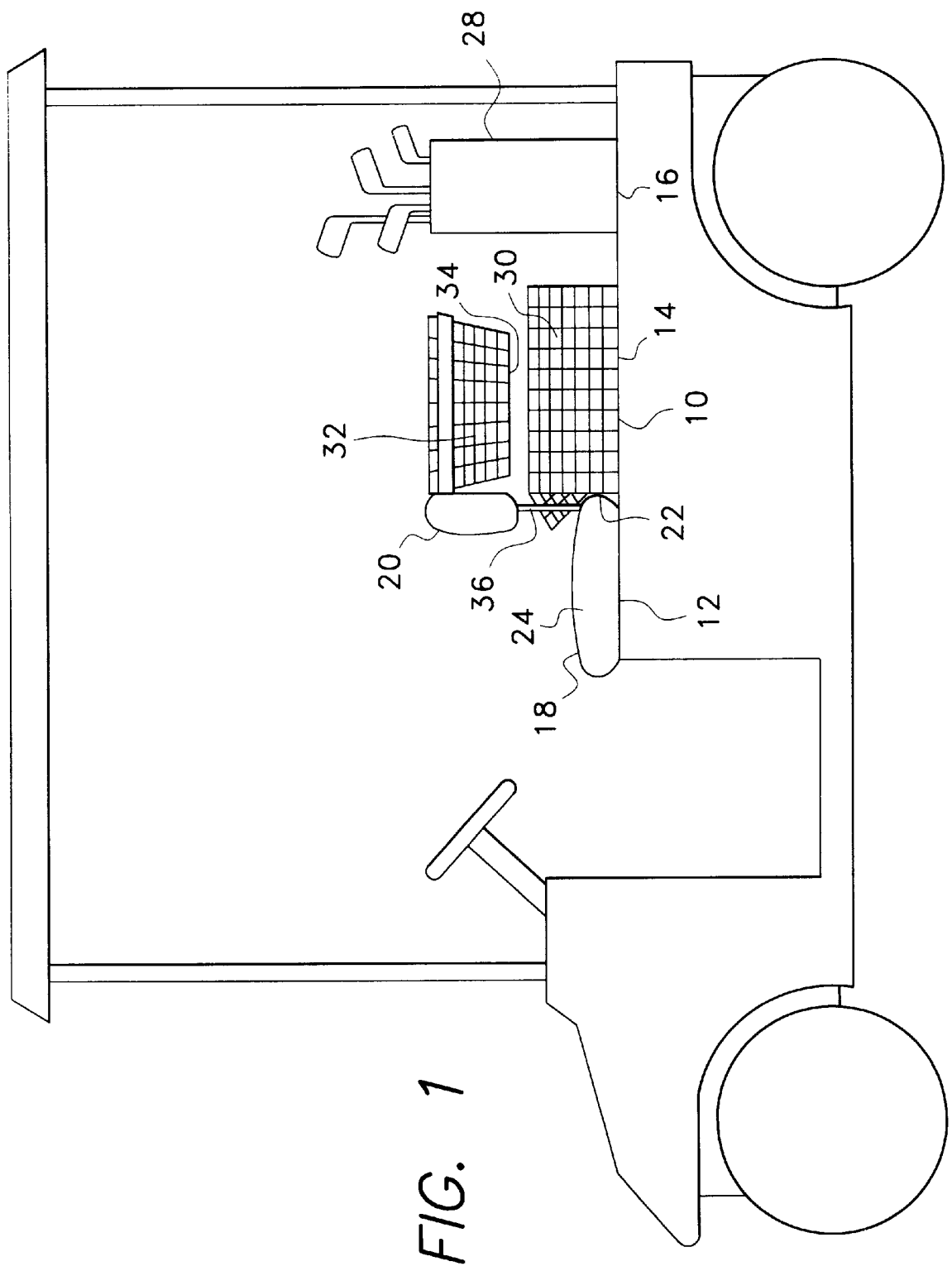
FIG. 1 is a side view of a motorized golf cart showing the location thereon of the present invention in its wire mesh embodiment.

In order to describe the location of the present invention on the upper surface 10 of the golf cart chassis, it is convenient to divide this upper surface into a front portion 12, a middle portion 14, and a rear portion 16. The front portion has at least one seat 18 mounted thereupon, with a backrest 20 and the rear 22 of the seat cushion 24 adjacent the middle portion 14. The rear portion 16 defines an aperture 26 for storing golf club bags 28 in a vertically disposed manner. Within this environment, the present invention consists of a storage container 30 designed to mount on the middle portion 14 of the chassis surface 10, between the backrest 20 and the golf bag aperture 26.

Any number of means may be used to secure the container 30 to the cart. For example, a plurality of nuts and bolts may be used to secure the bottom of the container to the middle portion of the chassis. Another example, includes adhesive backed clips which are easy to install thereby obviating the need for drilled holes for mechanical fasteners. One modification of the present invention that is commonly necessary arises because motorized golf carts typically include a wire basket 32 suspended a predefined distance above the middle portion 14. The bottom 34 of this preexisting wire basket places an upper limit on the height of the present invention. Of course, the precise dimensions of the present invention are widely adaptable, depending on the characteristics of the golf cart with which it is used.

Figure 2:
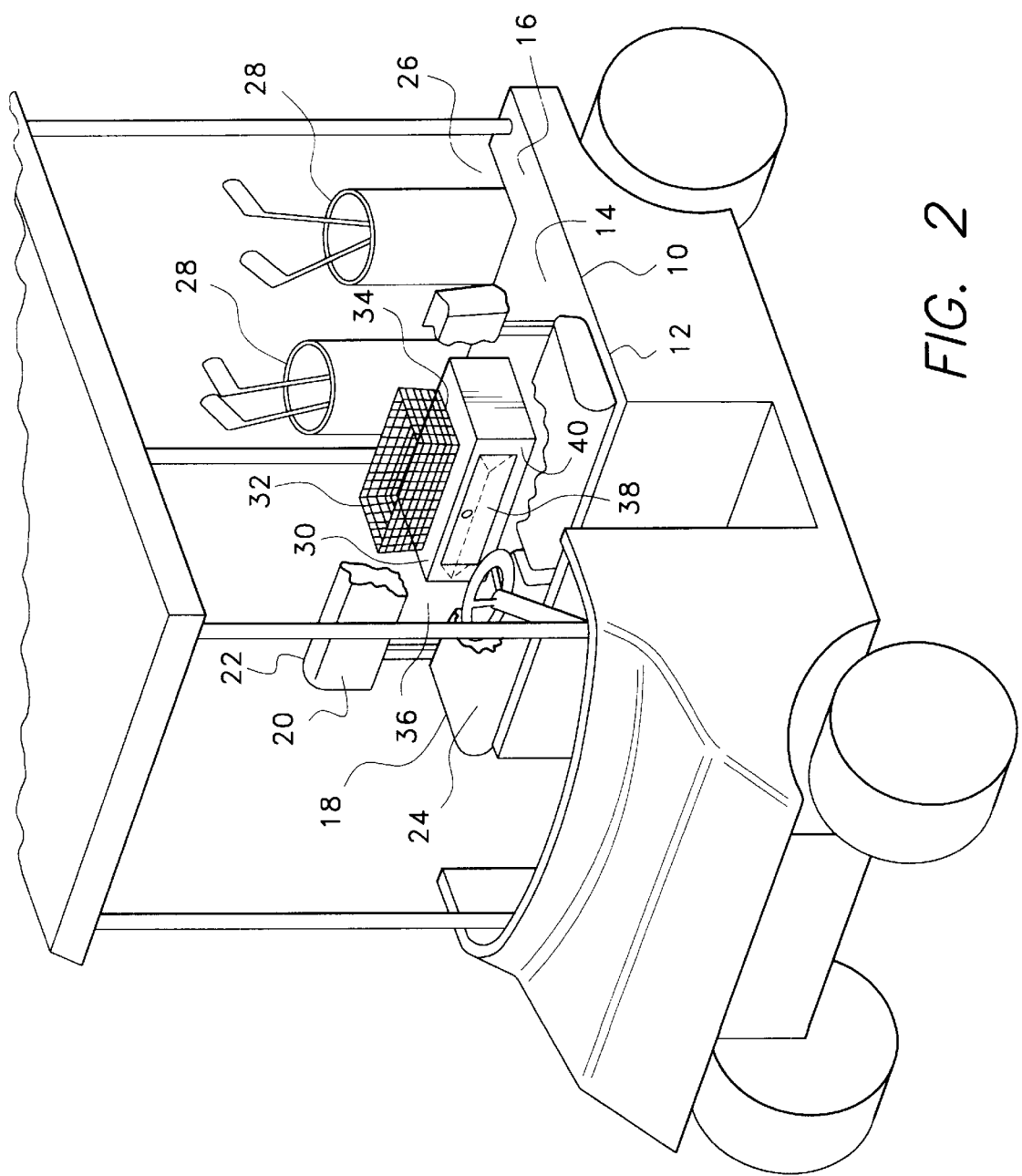
FIG. 2 is a perspective view of the golf cart, showing the location thereon of the present invention in its fully enclosed embodiment, as well as of the forward-facing door which may be included therewith.
Figure 3:
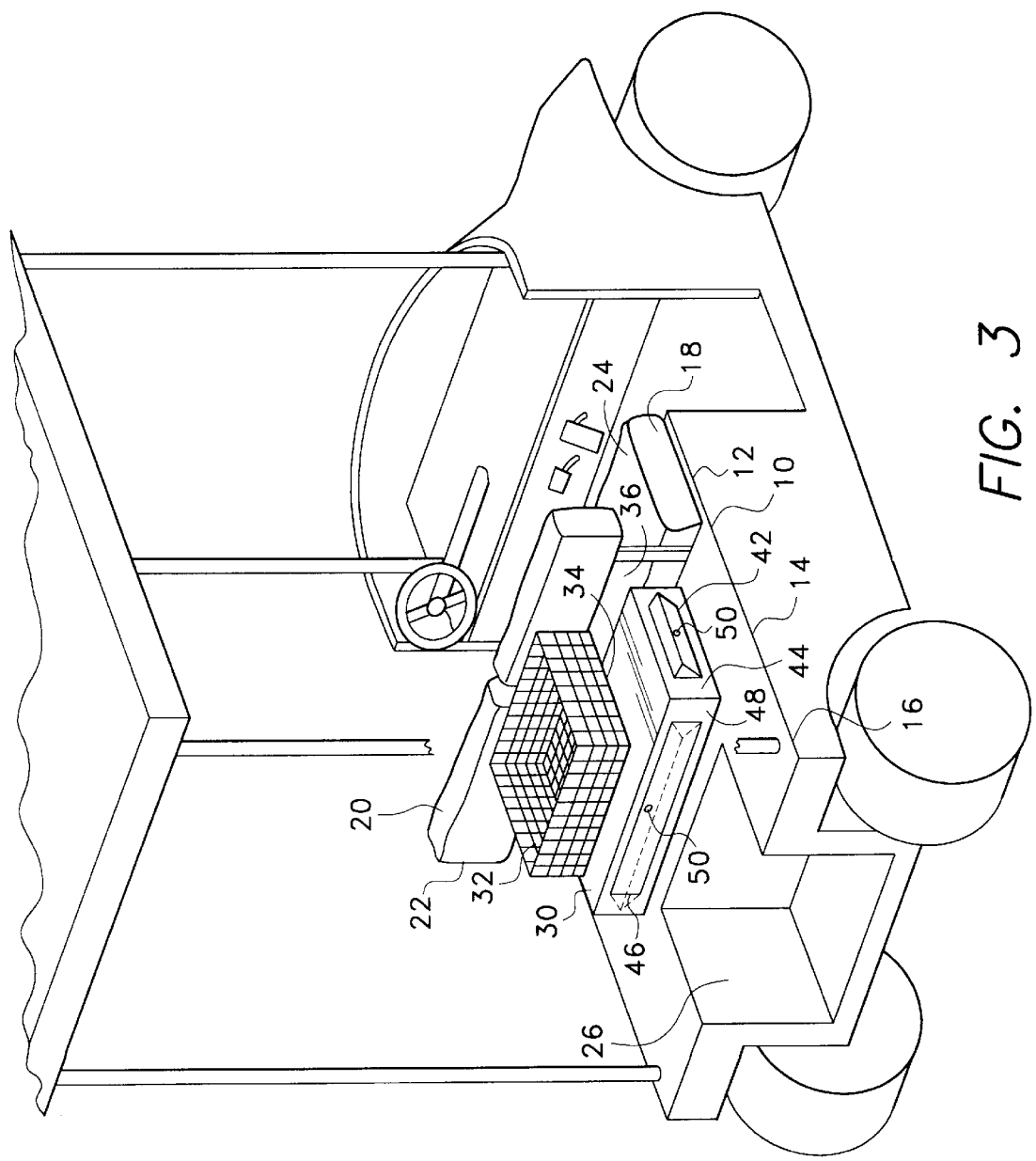
FIG. 3 is a perspective view of the golf cart from the rear, showing the location of the present invention thereon in its fully enclosed embodiment, along with the sidewardly facing and rearwardly facing doors which may be included therewith.

A number of other features of the invention may be varied as well. To begin, it is possible for the invention to be either an open-topped wire mesh basket, as depicted in FIG. 1, or an enclosed container consisting of solid material, such as hard plastic. Different versions of enclosed containers are depicted in FIGS. 2 and 3.

Figure 4:
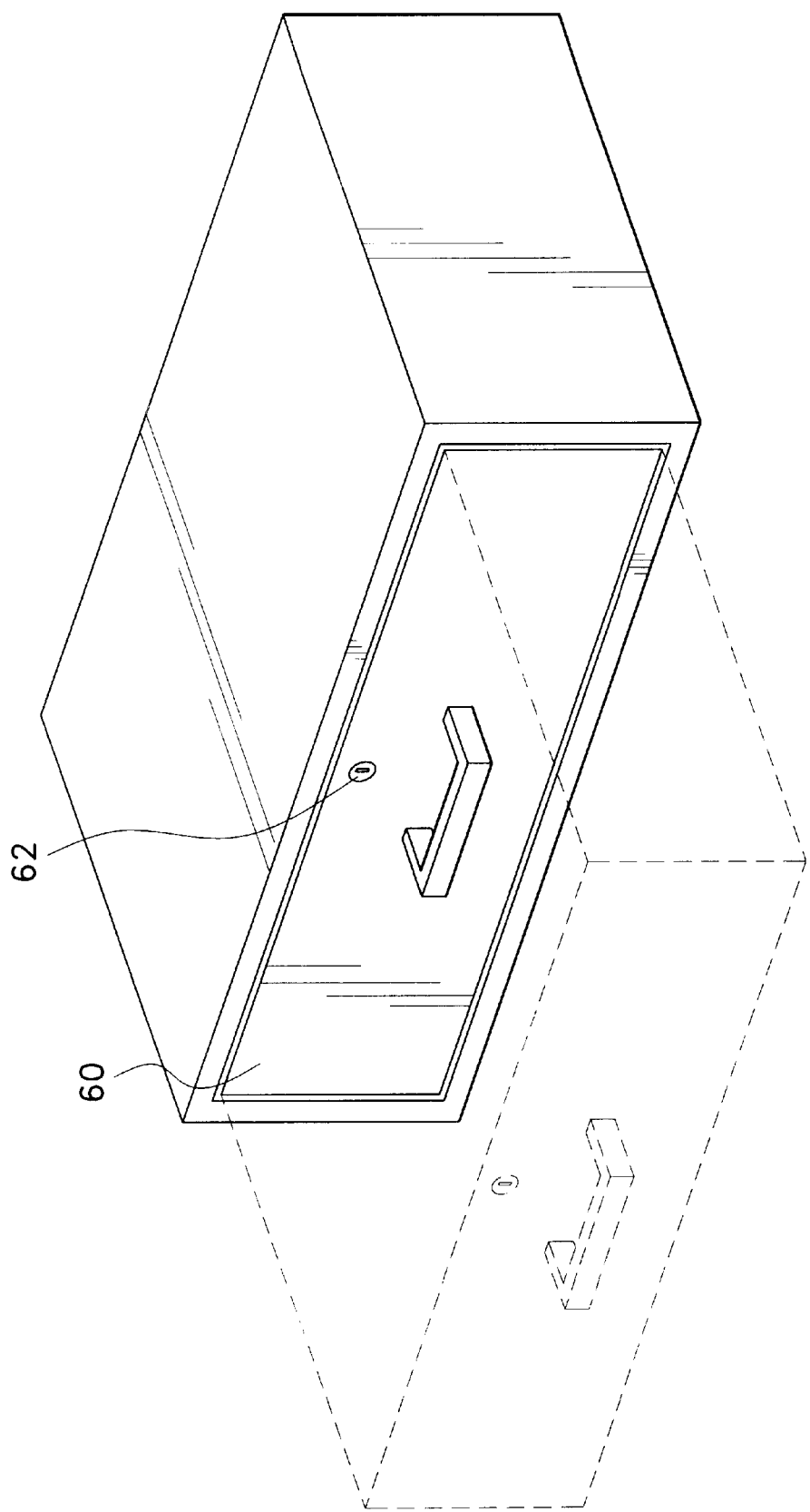
FIG. 4 illustrates an alternate embodiment of the present invention, wherein its interior is accessed by means of a drawer rather than a door.

The containers also vary in accordance with the manner in which one accesses the interior. One embodiment of the fully enclosed version, depicted in FIG. 2, takes advantage of the fact that the seat cushions 24 and the backrest 20 of the seats 18 in motorized golf carts are often positioned so as to define a vertical separation 36. As a result, the container may be accessed by reaching through this separation and opening a door 38 which is hingedly attached to the forward-facing portion 40 of the container. The wire mesh basket version of the container may also be constructed so as to be accessed from between the seat cushions 24 and the backrests 20, as shown in FIG. 1. In yet another embodiment of the present invention, pictured in FIG. 4, the door is replaced by a sliding drawer 60, which may also be equipped with a lock 62.

Alternatively, the container in its fully enclosed version may be accessed either from a door 42 located on one of the side faces 44 of the container 30 or from a door 46 on its rear face 48. Both these embodiments are depicted in FIG. 3. In all cases where there are doors, it would, of course, be advantageous to add a lock 50 so that the contents of the container 30 can be secured.

It is to be understood that the present invention is not limited to the embodiments described above, but encompasses any and all embodiments within the scope of the following claims.

I claim:

1. A golfcart and storage container combination comprising:

a motorized vehicle including chassis having front, middle and rear portions, said front portion having at least one seat mounted thereupon, said at least one seat having a backrest adjacent said middle portion, said backrest supporting a wire mesh basket above said middle portion at a predetermined height, said rear portion having a recessed compartment for supporting at least one golfbag in a substantially vertical disposition;

a container having a bottom face fixedly attached to the middle portion of the golfcart, a top face adjacent to a bottom of the wire mesh basket, and at least four side faces coupled between said bottom face and said top face, said top, bottom, and side faces defining an interior volume in said container;

means for accessing said interior volume of said container through at least one of said at least four side faces; and means for locking said means for accessing, whereby the interior volume of said container is secured from unwanted entry.

2. The storage container according to claim 1, said means for accessing consists of a door hingedly disposed in said at least one face.

3. The storage container according to claim 1, said means for accessing consists of a drawer disposed in said at least one face.

* * * * *